Patented Apr. 7, 1936

2,036,944

UNITED STATES PATENT OFFICE 2,036,944

INSOLUBLE DISAZO DYESTUFFS OF THE BENZIDINE SERIES AND THEIR PRODUCTION

Adolf Krebser, Basel, Switzerland, assignor to the firm J. R. Geigy A. G., Basel, Switzerland No Drawing. Application March 20, 1935, Serial No. 12,107. In Germany April 9, 1934

5 Claims. (Cl. 260—78)

According to this invention valuable disazo dyestuffs, which are insoluble in water and are very suitable for dyeing or coloring cellulose ester lacquers and spirit lacquers, as well as for application in the graphic art, for example in copper-plate printing, are made by coupling tetrazotized 4,4'-diamino-2,2'-dimethyl-diphenyl with a compound capable of being coupled and containing no sulphonic or carboxylic acid group, for example a phenol, a naphthol, a monoamine or a diamine.

The dyestuffs so obtained are distinguished by a high coloring power, a good fastness towards light and, above all, by their solubility in all lacquer mixtures and solvents which come into consideration; in this latter property the dyestuffs differ from other related disazo dyestuffs of the benzidine series such as are obtainable from the aforesaid coupling components and, for example, tetrazotized 4,4'-diaminodiphenyl, 4,4'-diamino-3,3'-dimethyl-diphenyl or 4,4'-diamino-3,3'-dimethoxy-diphenyl. These last named dyestuffs are quite unsuitable for the purposes above referred to owing to their sparing solubility, in fact by reason of this property some members of this class are known to be useful as insoluble pigment dyestuffs. These differences in solubility are surprising and nothing in the literature or prior knowledge would lead one to expect such completely different properties in the dyestuffs made in accordance with the invention from the aforesaid meta-substituted benzidine derivatives.

The following examples illustrate the invention:—

Example 1

21.2 kilos of 4,4'-diamino-2,2'-dimethyl-diphenyl are tetrazotized in the usual manner and combined in a medium alkaline with sodium carbonate with 21.6 kilos of 4-hydroxy-1-methylbenzene. The dyestuff when worked up in the customary manner is a yellow powder which dissolves in concentrated sulphuric acid to a yellow-red solution. Owing to its high coloring power, good fastness to light and good solubility it is excellently suited for coloring nitrocellulose and acetyl-cellulose lacquers and the mixtures of resin and solvent used in copper-plate printing.

Example 2

By combining the tetrazo solution prepared as described in Example 1 with an aqueous solution of 24.4 kilos of 2,4-diamino-1-methyl-benzene an insoluble dyestuff is obtained, after neutralization of the mineral acidity with a sodium acetate solution. When isolated and dried the dyestuff is a brown-orange powder which dissolves in concentrated sulphuric acid to a yellow-red solution the color of which changes towards violet on dilution with water. Apart from the shade, which is red-brown, the properties of this dyestuff correspond with those of the dyestuff described in Example 1.

If, in the foregoing examples, there is used, instead of the azo components prescribed, 1-amino-naphthalene, 3-hydroxy-2'-methyldiphenylamine or the like, there are obtained dyestuffs having orange-brown shades and having the same good properties.

Example 3

The quantity of diamino base given in Example 1 is tetrazotized and coupled with 34.8 kilos of 1-phenyl-3-methyl-5-pyrazolone in a medium alkaline with sodium carbonate. There is thus obtained an insoluble yellow dyestuff which dissolves in concentrated sulphuric acid to an orange solution. It colors the lacquers and solvents hereinbefore referred to beautiful yellow shades. Its coloring power is excellent; for example, a shade of the same strength as that obtained by means of the yellow dyestuffs described in U. S. Patent No. 1,819,957 can be obtained with a quantity of the new dyestuff which is less by 20 per cent.

Example 4

21.2 kilos of 4,4'-diamino-2,2'-dimethyl-diphenyl are tetrazotized in a solution as concentrated as possible and coupled in presence of ammonia with 43.2 kilos of the ethyl-ester of 2,3-hydroxynaphthoic acid dissolved in ethanol. The dyestuff, when worked up in the customary manner, is a bright red powder which dissolves in concentrated sulphuric acid to a violet solution. It colors lacquers and mixtures of resins and solvents beautiful blue-red shades having good fastness properties.

What I claim is:—

1. A process for the manufacture of disazo dyestuffs of the benzidine series which are insoluble in water, consisting in coupling tetrazotized 4,4'-diamino-2,2'-dimethyldiphenyl with an azo coupling component containing no acid group which renders the dyestuffs soluble in water.

2. A process for the manufacture of disazo dyestuffs of the benzidine series which are insoluble in water, consisting in coupling tetrazotized 4,4'-diamino-2,2'-dimethyldiphenyl in alkaline medium with 4-hydroxy-1-methylbenzene.

3. A process for the manufacture of disazo dyestuffs of the benzidine series which are insoluble in water, consisting in coupling tetrazotized 4,4'-diamino-2,2-dimethyldiphenyl with an aqueous solution of 2,4-diamino-1-methylbenzene.

4. A process for the manufacture of disazo dyestuffs of the benzidine series which are insoluble in water, consisting in coupling tetrazotized 4,4'-diamino-2,2'-dimethyldiphenyl in alkaline medium with 1-phenyl-3-methyl-5-pyrazolone.

5. Water insoluble disazo dyestuffs of the benzidine series from tetrazotized 4,4'-diamino-2,2'-dimethyldiphenyl and an azo coupling component containing no acid group which renders the dyestuffs soluble in water, said dyestuffs being of high coloring power, of good fastness to light and of great solubility in lacquer mixtures and solvents and being very suitable for coloring cellulose ester lacquers and spirit lacquers as well as for application in the graphic art.

ADOLF KREBSER.